United States Patent
Hwang et al.

(10) Patent No.: US 10,770,924 B2
(45) Date of Patent: Sep. 8, 2020

(54) RERADIATION ANTENNA AND WIRELESS CHARGING DEVICE

(71) Applicant: LG ELECTRONICS INC., Seoul (KR)

(72) Inventors: Joosung Hwang, Seoul (KR); Jeongkyo Seo, Seoul (KR); Sangju Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 404 days.

(21) Appl. No.: 15/560,914

(22) PCT Filed: Feb. 2, 2016

(86) PCT No.: PCT/KR2016/001125
§ 371 (c)(1),
(2) Date: Sep. 22, 2017

(87) PCT Pub. No.: WO2016/153169
PCT Pub. Date: Sep. 29, 2016

(65) Prior Publication Data
US 2018/0083493 A1    Mar. 22, 2018

(30) Foreign Application Priority Data
Mar. 25, 2015 (KR) .......... 10-2015-0041343

(51) Int. Cl.
*H01M 10/46* (2006.01)
*H02J 50/20* (2016.01)
(Continued)

(52) U.S. Cl.
CPC ............... *H02J 50/20* (2016.02); *H01Q 1/24* (2013.01); *H01Q 1/38* (2013.01); *H01Q 1/48* (2013.01);
(Continued)

(58) Field of Classification Search
CPC .......... H02J 7/355; H02J 7/0042; H02J 5/005; H02J 7/025; H02J 50/15; H02J 50/20; H02J 50/27
(Continued)

(56) References Cited

U.S. PATENT DOCUMENTS

| 2012/0187767 | A1* | 7/2012 | Kanno | H02J 50/40 |
| | | | | 307/82 |
| 2013/0300358 | A1 | 11/2013 | Kirby et al. | |
| 2016/0204645 | A1* | 7/2016 | Mitcheson | H02J 50/00 |
| | | | | 320/108 |

FOREIGN PATENT DOCUMENTS

| JP | 2005-73168 A | 3/2005 |
| JP | 2011-249881 A | 12/2011 |

(Continued)

*Primary Examiner* — Edward Tso
(74) *Attorney, Agent, or Firm* — Birch, Stewart, Kolasch & Birch, LLP

(57) ABSTRACT

A reradiation antenna comprises, an insulation plate; a loop-shaped radiation unit formed on one surface of the insulation plate, disposed along an outer circumference of the insulation plate, and having one end and the other end disposed to be adjacent to each other; a ground connected to the end of the radiation unit; and a power supply unit connected to the other end of the radiation unit so as to supply power, and can receive a wireless signal and transmit the wireless signal to a terminal without degrading the performance of a wireless charging device.

20 Claims, 13 Drawing Sheets

(51) Int. Cl.
    *H01Q 7/00*     (2006.01)
    *H02J 50/10*     (2016.01)
    *H04B 7/14*     (2006.01)
    *H01Q 1/24*     (2006.01)
    *H01Q 1/38*     (2006.01)
    *H01Q 1/48*     (2006.01)
    *H02J 50/12*     (2016.01)
    *H02J 7/02*     (2016.01)
    *H01Q 9/30*     (2006.01)
    *H04B 7/15*     (2006.01)
    *H01Q 5/371*     (2015.01)
    *H02J 50/27*     (2016.01)
    *H02J 50/23*     (2016.01)
    *H01F 38/14*     (2006.01)

(52) U.S. Cl.
    CPC ............... *H01Q 7/00* (2013.01); *H02J 7/025* (2013.01); *H02J 50/10* (2016.02); *H02J 50/12* (2016.02); *H04B 7/14* (2013.01); *H01F 38/14* (2013.01); *H01Q 1/243* (2013.01); *H01Q 5/371* (2015.01); *H01Q 9/30* (2013.01); *H02J 50/23* (2016.02); *H02J 50/27* (2016.02); *H04B 7/15* (2013.01)

(58) Field of Classification Search
    USPC .................................. 320/107, 108; 307/104
    See application file for complete search history.

(56) References Cited

FOREIGN PATENT DOCUMENTS

| | | |
|---|---|---|
| JP | 2014-39238 A | 2/2014 |
| KR | 10-2010-0019780 A | 2/2010 |

\* cited by examiner

@900MHz
(a)

@1800MHz
(b)

@2100MHz
(c)

@2700MHz
(d)

RERADIATION ANTENNA AND WIRELESS CHARGING DEVICE

CROSS REFERENCE TO RELATED APPLICATIONS

This application is the National Phase of PCT International Application No. PCT/KR2016/001125, filed on Feb. 2, 2016, which claims priority under 35 U.S.C. 119(a) to Patent Application No. 10-2015-0041343, filed in the Republic of Korea on Mar. 25, 2015, all of which are hereby expressly incorporated by reference into the present application.

FIELD

Embodiments of the present invention relate to a reradiation antenna which may receive and reradiate a wireless signal and a wireless charger having the reradiation antenna not to degrade wireless charging.

BACKGROUND

As skyscrapers and indoor rooms become more diversified, there are shadow areas having poor radio environments in wireless communication systems in buildings. The wireless communication system has deteriorated radio transceiving environments in a vehicle of which a body is made of metal.

As one of techniques for dealing with such a disadvantage, the poor radio environment is improved by using a repeater. The techniques using the repeater is configured to improve radio environments by using a positive repeater using two antennas and a bi-direction or duplex amplifying circuit disposed between the two antennas or a passive repeater configured to connect two antennas with each other via a coaxial cable or a waveguide.

More specifically, an antenna is installed outside a building or vehicle and connected with a reradiation antenna which is installed in the building or vehicle via a waveguide or coaxial cable, so as to improve the radio environment of a shadow area.

However, the technique using the repeater radiating an electromagnetic wave and is likely to affect peripheral electronic devices. Especially, in case electronic equipments are intensively installed in a building or vehicle, other devices might be affected disadvantageously. Also, it is difficult to apply the technique using the repeater to diverse communication standards having different-bands frequencies.

Accordingly, there are increasing demands for developments of an antenna which may improve communication environments, without such the disadvantages.

DETAILED DESCRIPTION OF THE INVENTION

Technical Problem

To overcome the disadvantages, an object of the present invention is to provide a reradiation antenna which may improve communication environments, without deteriorating a function of a wireless charging device, even while arranged near a wireless charging device, and a wireless charging device including the reradiation antenna.

Technical Solution

To achieve these objects and other advantages and in accordance with the purpose of the embodiments, as embodied and broadly described herein, a reradiation antenna comprises an insulating board; a loop-shaped radiation unit formed in one surface of the insulating board, with one end and the other end which are arranged adjacent to each other; a ground connected with the end of the radiation unit; and a power supply unit connected with the other end of the radiation unit and configured to supply an electric power.

The insulating board may be rectangular-shaped, and the end and the other end of the radiation unit may be arranged adjacent to one corner of a lower end of the insulating board.

The reradiation antenna may further comprise an auxiliary radiation unit extended from a portion near the end of the radiation unit in a horizontal direction with respect to the insulating board.

The auxiliary radiation unit may be located in the loop of the radiation unit.

A portion of the radiation unit arranged in a horizontal direction of the insulating board may have a larger width than a portion of the insulating board in a vertical direction.

The radiation unit may comprise a plurality of projections projected toward an inner portion of the loop.

The plurality of the projections may be arranged at equidistant intervals.

The reradiation antenna may further comprise an electromagnetic field shut-off pattern located in a central portion of the other surface of the insulating board and comprising a plurality of conductive tapes which are extended horizontally and arranged vertically, in parallel.

The radiation unit may comprise at least one of Polysilicon, Ceramic, Carbon fiber, Conductive ink, Conductive paste, ITO (Indium Tin Oxide), CNT (Carbon Nano Tube) and conductive polymer.

In another aspect of the present disclosure, a wireless charging device comprises a housing; a power transmission coil located in the housing and configured to transmit power to an external mobile terminal; a reradiation antenna located on the wireless transmission coil and configured to receive and re-radiate an antenna signal; and a power supply unit configured to supply power to the power transmission coil and the reradiation antenna, wherein the reradiation antenna comprises an insulating board; a loop-shaped radiation unit formed in a predetermined portion of one surface of the insulating board, where the loop-shaped radiation unit is not overlapped with the power transmission coil; a ground connected with the end of the radiation unit; and a power supply unit connected with the other end of the radiation.

The insulating board may be rectangular-shaped, and the end and the other end of the radiation unit may be arranged adjacent to one corner of a lower end of the insulating board.

The wireless charging device may further comprise an auxiliary radiation unit extended from a portion near the end of the radiation unit in a horizontal direction with respect to the insulating board.

The radiation unit may comprise a plurality of projections projected toward an inner portion of the loop.

The wireless charging device may further comprise an electromagnetic field shut-off pattern located in a central portion of the other surface of the insulating board and comprising a plurality of conductive tapes which are extended horizontally and arranged vertically, in parallel.

Advantageous Effects

According to at least one of the embodiments of the present disclosure, the reradition antenna is capable of receiving and transmitting a wireless signal to a terminal, without deteriorating the function of the wireless charging device.

Furthermore, the reradiation antenna has the function which may not be degraded by the electromagnetic field shut-off sheet provided in the wireless charging device so that it has a high efficiency.

Furthermore, the reradiation antenna is versatile when transceiving diverse frequencies and then has versatility.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 5b is a S-parameter graph showing efficiency of the reradiation antenna shown in FIG. 5a;

FIG. 6b is a S-parameter graph showing efficiency of the reradiation antenna shown in FIG. 6a;

FIG. 7b is a S-parameter graph showing efficiency of the reradiation antenna shown in FIG. 7a;

FIG. 8 is a drawing which shows distribution of electric fields for frequency bands of the reradiation antenna shown in FIG. 7a;

FIG. 10b is an S-parameter graph showing efficiency of the conventional reradiation antenna shown in FIG. 10a.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
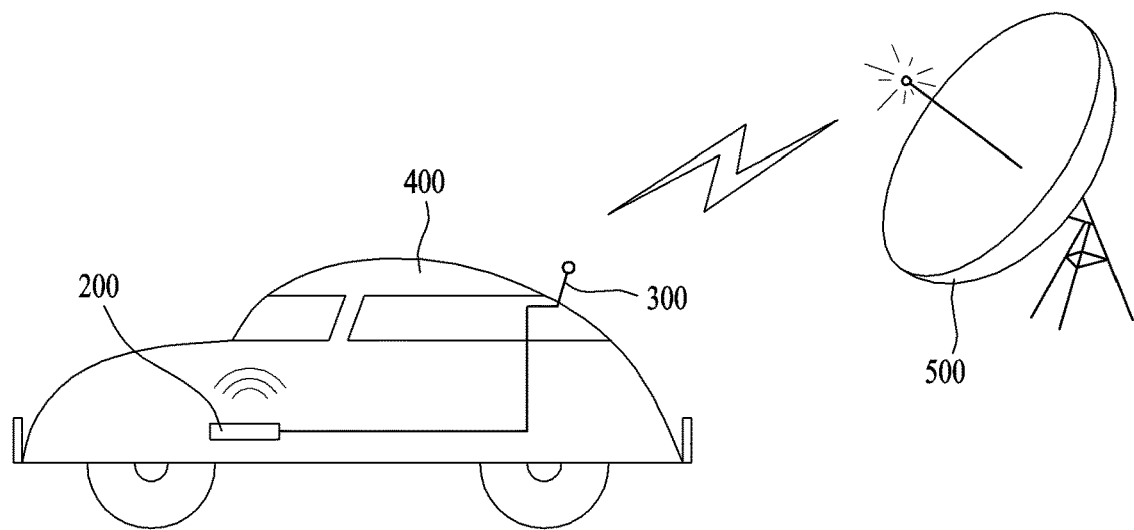
FIG. 1 is a diagram illustrating a concept of a reradiation antenna in accordance with the present disclosure.

FIG. 1 is a diagram illustrating a concept of a reradiation antenna 200 in accordance with the present disclosure. A terminal 600 located in a building or vehicle 400 might be collided against or blocked by the metal used in a body of the vehicle 400 enough to noticeably deteriorate radio transceiving efficiency. Such an area in which radio waves are partially failed to be transmitted is called 'the shadow area'. To enhance radio wave transmission efficiency, a reradiation antenna 200 may be provided.

An external antenna 300 may be provided outside the vehicle 400 and configured to receive and transmit a signal to a terminal 600 located in the vehicle 400 via the reradiation antenna 200, so as to enhance the radio wave transmission efficiency of the terminal 600.

In this instance, the reradiation antenna 200 is configured to receive and transmit the signal by using the electromagnetic wave, so that it might affect peripheral devices or be affected by them. Considering the relation with other peripheral devices, the reradiation antenna 200 has to be arranged in an area where it can be affected least. However, if the reradiation antenna 200 is located far from the terminal 600, the function of the reradiation antenna 200 might decrease disadvantageously. There are many studies and researches about the reradiation antenna 200 which is capable of reducing the distance with the terminal 600 and minimizing the effect of the reradiation antenna and the peripheral devices simultaneously.

Figure 2:
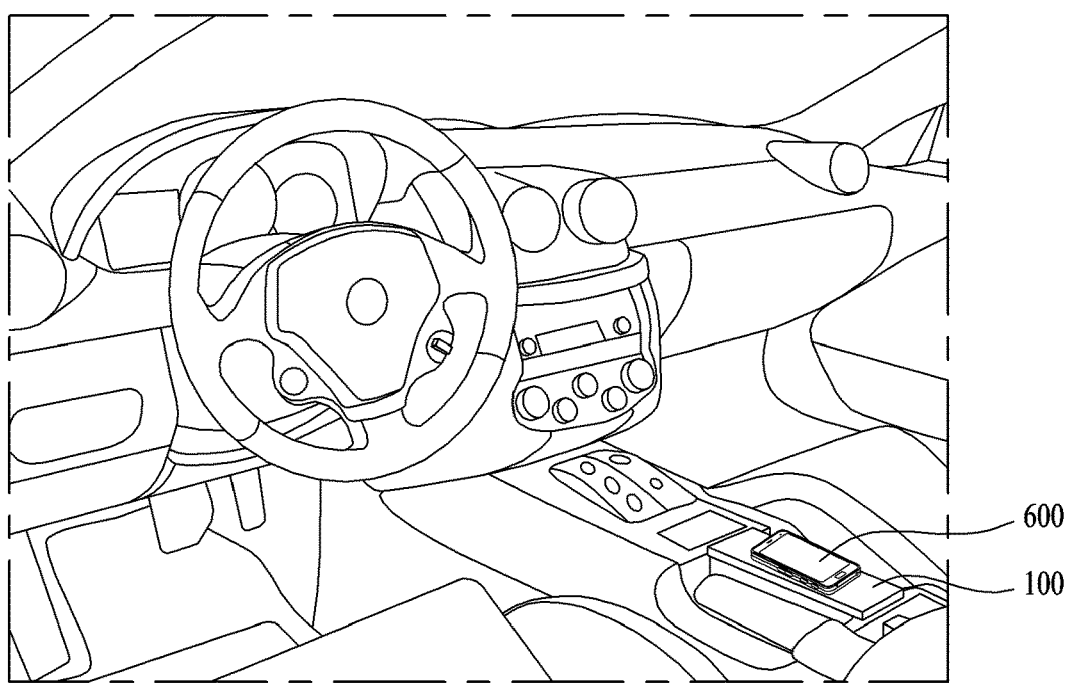
FIG. 2 is a diagram illustrating a state where a wireless charging device in accordance with the present disclosure stands in a vehicle.

FIG. 2 is a diagram illustrating a state where the wireless charging device 200 in accordance with the present disclosure stands in the vehicle 400.

Recently have been released the chargers for charging a battery of the terminal 600 wirelessly. Such a wireless charging method has an advantage of being chargeable only when the terminal 600 stands on the wireless charging device 100 and another advantage of solve the inconvenience that the user has to separate a charge cable every use.

Especially, when trying to re-stand the terminal 600 while using it, the user has to couple or decouple the cable to or from the terminal 600 repeatedly enough to interrupt the driving and also has difficulties in using the terminal with the cable coupled thereto. Accordingly, the wireless charging device 100 is mounted in the vehicle 400 to charge the terminal 600.

The terminal 600 is usually used in the vehicle 400 having the wireless charging device 100, in a state of standing on the wireless charging device 100. It is likely for the user to make or answer a call via hands-free kit, using a Bluetooth function, while the terminal is standing on the wireless charging device 100. The reception of antenna signals is very important in a state where the terminal 600 is standing on the wireless charging device 100.

Accordingly, the reradiation antenna 200 has to be as close to the terminal 600 as possible to maximize the efficiency of the reradiation antenna 200 in the vehicle 400. It is preferred that the reradiation antenna 200 is provided in the wireless charging device 100.

In this instance, the reradiation antenna 200 and a power transmission coil 140 of the wireless charging device 100 might be interactive with each other. Embodiments of the present disclosure provide the reradiation antenna 200 which is capable of minimizing the interaction between the power transmission coil 140 and the reradiation antenna 200 and the wireless charging device 100 including such the reradiation antenna 200.

Figure 3:
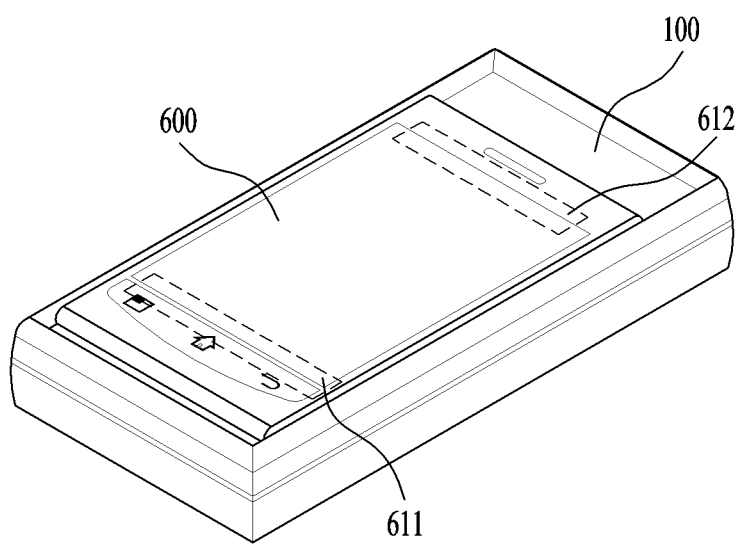
FIG. 3 is a diagram illustrating a state where a mobile terminal is standing on a wireless charging device.

FIG. 3 is a diagram illustrating a state where the mobile terminal 600 is standing on a wireless charging device 100. The mobile terminal 600 may include diverse wireless communication units. Examples of the wireless communication units may include a broadcasting receive module for receiving broadcasting signals, a mobile communication module for mobile communication, a wireless internet module for wireless internet, a short range wireless communication module for transceiving data with an external device located in a short range by a wireless communication method, and a location information module for acquiring the location of the mobile terminal 600.

The broadcasting receive module is configured to receive a broadcasting signal and information about broadcasting programs from an external broadcasting management server via broadcasting channels. Examples of the broadcasting-related information include EPG (Electronic Program Guide) of DMD (Digital Multimedia DMB (Digital Multimedia Broadcasting or ESG (Electronic Service Guide) of DVB-H (Digital Video Broadcast-Handheld).

The antenna is required to receive such the broadcasting-related information and the broadcasting receive module may use a monopole antenna extractable from a terminal case.

The mobile communication module is configured to transceive a wireless signal with at least one of a base station, an external terminal and an external server on a mobile communication network which is built based on standard techniques or communication methods for mobile communication (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced) and the like).

The wireless signal may include diverse types of data based on a voice call signal, a video call signal or texture/multimedia message reception/transmission. The antenna for mobile communication is employed to serve a main function of the mobile terminal 600 so that it can be called the main antenna. As the antenna for mobile communication uses a different frequency for each of diverse technique standards for mobile communication, there are increasing needs for a broad-band antenna.

The user is likely to hold the mobile terminal 600 on the ear directly to make or answer a call. In case the antenna is located in a top portion of the mobile terminal 600, radio wave transceiving occurs near the user's brain. To maximize the distance between the antenna and the user's brain, the main antenna may be located in a lower end 611 of the mobile terminal or a predetermined region adjacent to the voice receive unit.

Other wireless communication methods are not used directly on the user's ear, so that the antenna may be located in an upper portion 612 or a rear surface of the mobile terminal 600.

The wireless internet module means a module for wireless internet connection and it may be embedded in the mobile terminal 600 or mounted in an outer surface of the mobile terminal 600. The wireless internet module is configured to transceive a wireless signal on a communication network according to wireless internet techniques.

Examples of the wireless internet techniques include WLAN (Wireless LAN), Wi-Fi (Wireless-Fidelity) and Wi-Fi (Wireless Fidelity) Direct. The wireless internet module may transceive data according to at least one of the wireless internet techniques in a range even to internet techniques not mentioned above.

Considering that Wireless internet connection based on WiBro, HSDPA, HSUPA, GSM, CDMA, WCDMA, LTE and LTE-A is implemented by mobile communication networks, the wireless internet module implemented to perform wireless internet connection via the mobile communication network may be understood as one type of the mobile communication module.

The short range communication module is for short range communication and configured to support wireless communication between the mobile terminal 600 and the wireless communication system, another mobile terminal 600 or a network in which another mobile terminal 600 (or an external server) is located. The short range wireless communication networks may be wireless personal area networks.

The location information module is the module for acquiring the location or present location of the mobile terminal 600. Typical examples of the location information module include GPS (Global Positioning System) and WiFi (Wireless Fidelity). As one example, the mobile terminal using a GPS module is capable of acquiring the location of the mobile terminal 600 based on a signal transmitted from a GPS satellite. As another example, the mobile terminal 600 using WiFi is capable of acquiring the location of the mobile terminal 600 based on information of AP (Wireless Access Point) configured to transceive a wireless signal with the Wi-Fi module.

As other components are located in a middle portion of the mobile terminal 600, radio waves might be interrupted by the user holding the mobile terminal 600 and the signal reception rate might be then deteriorated. Because of that, it is typical to arrange the antenna in the upper portion and the lower portion of the mobile terminal 600 dividedly.

Exceptively, a close-range antenna such as NFC or RFID is configured to be used by direct contact with the mobile terminal 600 and provided in a rear surface of the mobile terminal 600.

Figure 4:
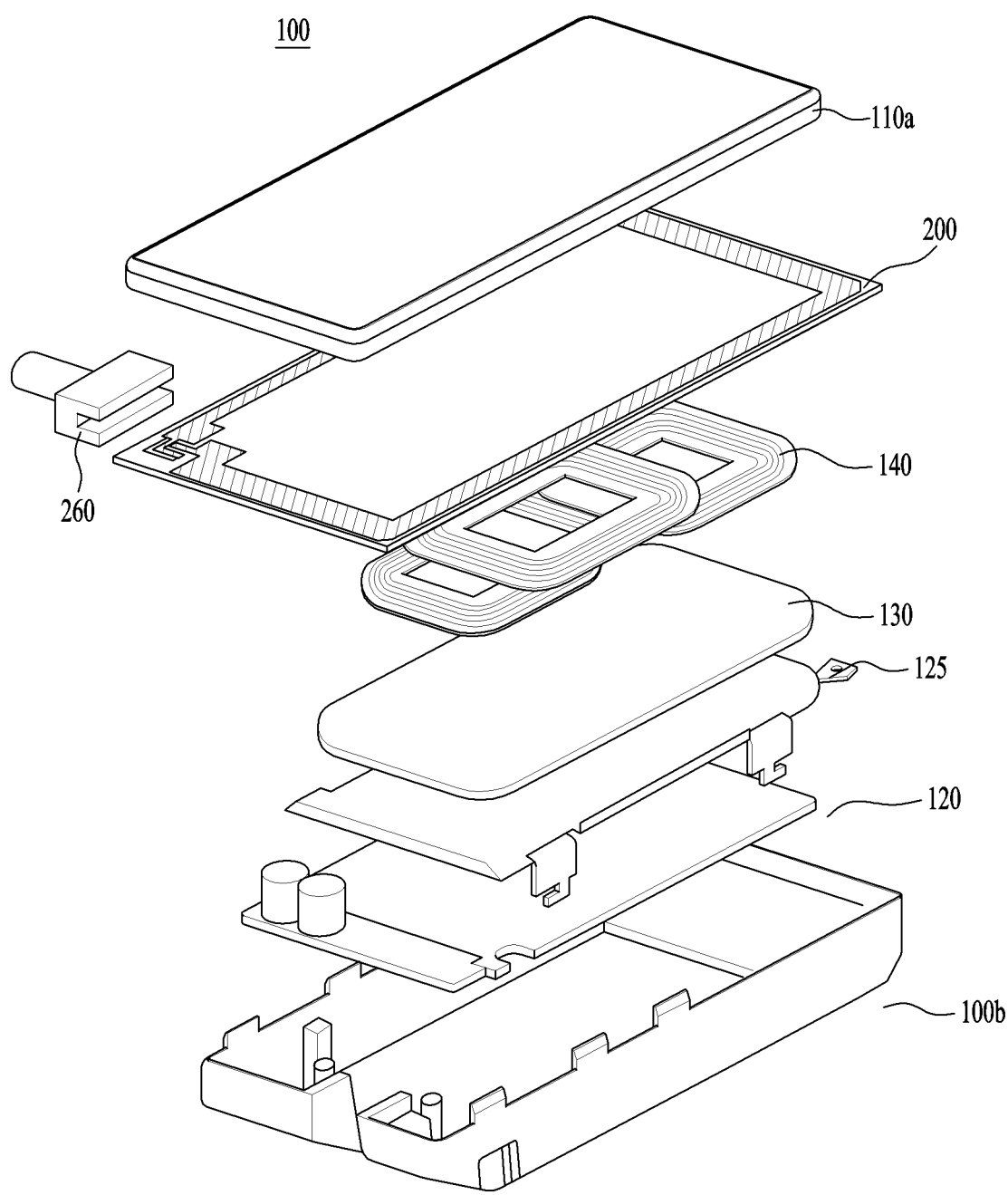
FIG. 4 is an exploded perspective diagram of the wireless charging device.

FIG. 4 is an exploded perspective diagram of the wireless charging device 100. The wireless charging device 100 includes a housing 110*a* and 110*b* in which electric control components are loaded; a printed circuit board 120 provided as a controller mounted in the housing; a shield can 125; a power transmission coil 140; and the reradiation antenna 200.

The housing 110*a* and 110*b* may be configured of an upper housing 110*a* and a lower housing 110*b*. In the housing may be loaded the power transmission coil 140 and the reradiation antenna 200. A ground for supplying the power which will be supplied to the power transmission coil 140 and a ground for supplying the antenna signal received from the outer antenna 300 to the reradiation antenna 200 may be exposed outside the housing.

Projections 225 may be formed along an upper rim of the housing 110*a* and 110*b* or a material having a high frictional force (for example, non-woven fabric, silicon, rubber and the like) is added to an upper surface of the housing, to dispose the mobile terminal 600 on an upper surface of the housing 110*a* and 110*b* and prevent the mobile terminal 600 from separating from the upper surface of the housing 110*a* and 110*b*.

The controller 120 is configured to supply the applied external power to the power transmission coil 140 and to transmit the signal received from the external antenna 300 to the reradiation antenna 200. The printed circuit board 120 may be used as the controller. The shield can 125 may be further provided in an upper surface of the printed circuit board 120 to radiate heat and have some components loaded thereon.

Once currents flow, an electromagnetic field is formed in the power transmission coil 140 located on the printed circuit board 120 and the electromagnetic field allows the currents to flow to the power receive coil of the external mobile terminal 600 to charge the external mobile terminal 600. In this embodiment, the power transmission coil 140 is located over the shield can 125.

The wireless charging method includes a magnetic resonance charging method and an electromagnetic induction charging method. The electromagnetic induction charging method is configured to charge a charge-needed electronic device by using an induction current principle. The currents flowing along the power transmission coil 140 loaded in the portable charging device form the electromagnetic field and the electromagnetic field allow the currents to flow to the power transmission coil located in the electromagnetic field.

The magnetic resonance charging method is configured to perform charging by using a resonance which vibrates in broad amplitude at a specific frequency. Such the magnetic resonance charging method uses a strong magnetic field coupling which is formed between the power transmission coil 140 having the same resonance frequency and the power reception coil 13.

The magnetic resonance charging method has a high efficiency but has to have the power transmission coil 140 and the power reception coil arranged adjacent to each other. If the coils are spaced apart from each other or inclinedly arranged, the efficiency falls remarkably. Accordingly, the arrangement between the power transmission coil 140 and the power reception coil is very important in the magnetic resonance charging method.

In contrast, the electromagnetic induction charging method has a not-so high efficiency, compared with the electromagnetic induction charging method, but it allows the charging even in a far distance so as to have an advantage of no-use-limit. In addition, the not-used energy is re-absorbed by the electromagnetic field advantageously.

A ferrite sheet 130 may be further provided in an upper or lower surface of the power transmission coil 140. The ferrite sheet 130 may improve the circuit flow of a coil magnetic flux line and reduce the radiometric quantity of the electromagnetic field which comes out from the power transmission coil 140.

When the reradiation antenna 200 made of a conductive material is located in the upper surface of the power transmission coil 140 as shown in FIG. 4, the magnetism generated in the power transmission coil 140 might fail to pass through the reradiation antenna 200 and the function of the wireless charging device 100 might be then deteriorated.

It is difficult to transmit the magnetism radiated from the power transmission coil 140 and passing through the reradiation antenna 200 to the power reception coil. Accordingly, the magnetism transmission efficiency to the mobile terminal 600 disposed on the upper surface of the housing 110*a* and 110*b* might be deteriorated. In contrast, when the reradiation antenna 200 is disposed under the power transmission coil 140, the signal radiated from the antenna is mixed with the noise by the power transmission coil 140 enough to deteriorate the communication quality disadvantageously.

To solve the disadvantage, the reradiation antenna 200 in accordance with the present disclosure may not interrupt the transmission of the magnetism from the power transmission coil 140 to the mobile terminal 600, while disposed on the upper surface of the power transmission coil 140 and the wireless charging device 100 may include such the reradiation antenna 200.

Figure 5A:
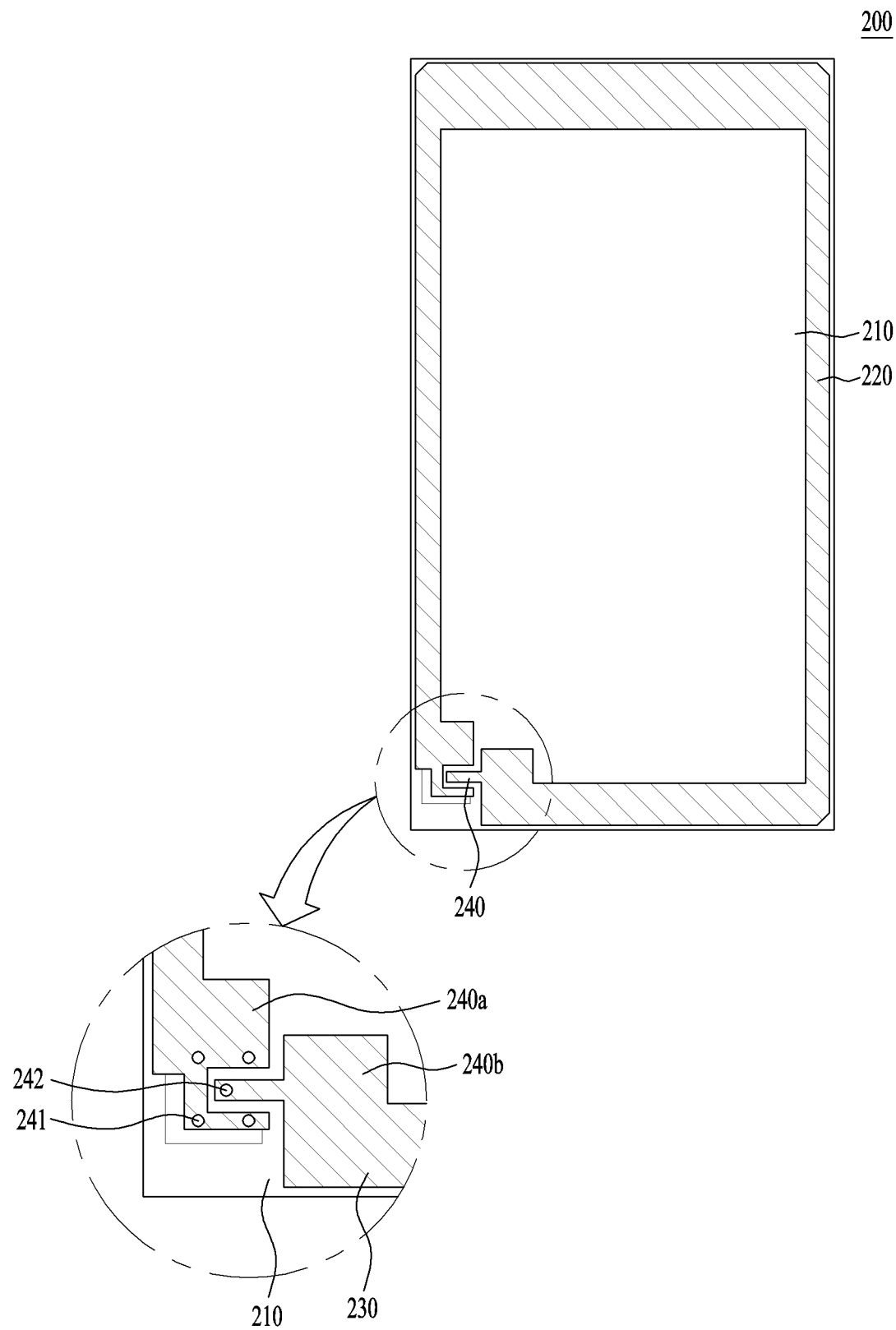
FIG. 5a is a plane view illustrating one surface of the reradiation antenna in accordance with one embodiment.
Figure 5B:
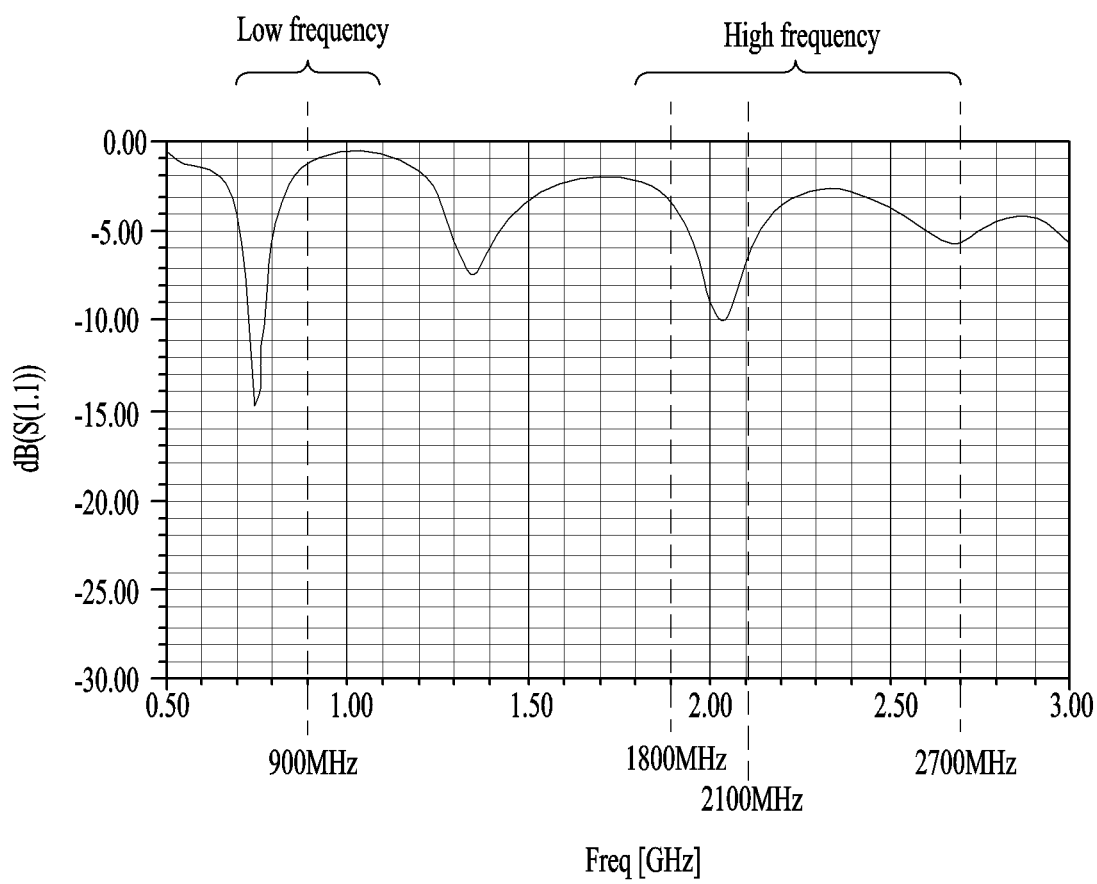

FIG. 5*a* is a plane view illustrating one surface of the reradiation antenna 200 in accordance with one embodiment. FIG. 5*b* is an S-parameter graph showing efficiency of the reradiation antenna 200 shown in FIG. 5*a*.

The reradiation antenna 200 includes an insulation board 210 having an insulating resin or a thermosetting-resin-based insulating material; and a radiation unit 220 made of a conductive material and formed in one surface of the insulating board 210. The radiation unit 220 is arranged along a rim of the insulating board 210, with an empty center portion to prevent the deterioration of the power transmission efficiency from the mobile terminal 600 located on the upper surface of the wireless charging device 100 from the power transmission coil 140.

The radiation unit 220 of the reradiation antenna 200 may be formed thicker which is located in the upper and lower portions of the insulating board 210 so as to enhance the coupling efficiency with the antenna located in the upper and lower portions of the mobile terminal.

The radiation of the reradiation antenna 200 may be formed by an exposure etching method for etching a copper thin film formed in the insulating board 210 or a pattern of the radiation unit 220 may be printed on the insulating board 210 by a printing method, using a printer.

Figure 10A:
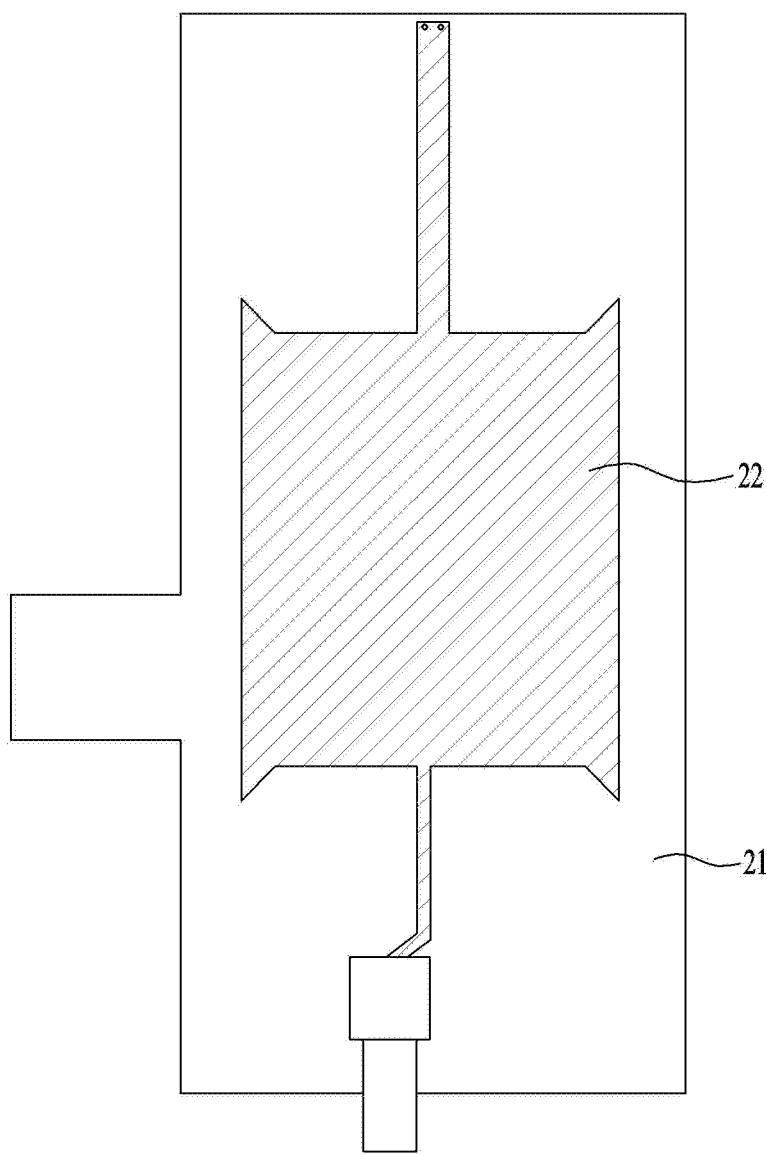
FIG. 10a is a plane view illustrating a conventional reradiation antenna.
Figure 10:
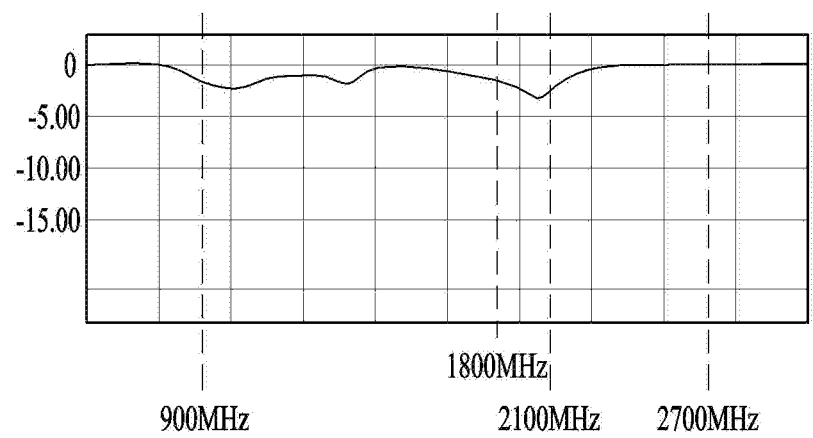

FIG. 10*a* illustrates a conventional reradiation antenna 20. The radiation unit 220 is located in a central portion of the conventional reradiation antenna 20 and the power transmission coil 140 is also located near the center portion. Accordingly, the magnetic field generated in the power transmission coil 140 might fail to pass through the radiation unit 22 such that the charging of the mobile terminal 600 may not be performed smoothly.

In contrast, as shown in FIG. 5a, the central portion of the reradiation antenna 200 of the present disclosure includes no conductive material. Accordingly, the magnetic field generated in the power transmission coil 140 may be transmitted to the wireless power reception coil of the mobile terminal 600 disposed on the upper surface of the wireless charging device 100, without being interrupted.

The radiation unit 220 of the present disclosure is loop-shaped, with both ends arranged adjacent to each other. The radiation unit 220 is formed along an outer circumference of the insulating board 210, avoiding the portion where the power transmission coil 140 is located. If the power transmission coil 140 is formed in the outer circumference, the radiation unit 220 may be formed in the central portion. In other words, the radiation unit 220 is formed in a portion where it is not overlapped with the power transmission coil 140. It is preferred that the entire region is not overlapped with the power transmission coil 140 and not limited thereto.

One end of the radiation unit 220 is connected with a power supply device and the other end is connected with the ground so that the currents supplied from the power supply device may generate a radio wave with a specific wavelength. The radio wave is determined based on the supplied currents and the length and shape of the radiation unit 220.

Referring to FIG. 5a illustrating the enlarged view of the portion where the both ends of the radiation unit 220 are arranged adjacent to each other, one end is spaced a preset distance apart from the other end of the radiation unit 220. A connection hole for connecting the radiation unit 220 with a connector (260, see FIG. 4) may be formed in each end to connect the radiation unit 220 to the power and the ground.

FIG. 5b is a graph showing the performance of the reradiation antenna 200 having the structure shown in FIG. 5a. A horizontal axis refers to frequency and a vertical axis refers to S-parameter. The rate of the strength of the signal output after reflected on a signal incident on the reradiation antenna 200 is shown in decibel domain. As the strength of the signal output after reflected on the signal incident on the reradiation antenna 200 becomes decreased, a reflection coefficient is a negative value. As the reflection coefficient gets smaller, the strength of the reflected signal gets increased. The size of the reflection coefficient near mobile communication frequencies which is used in 3-generation communication (900 MHz, 1800 MHz, 2100 MHz and 2700 MHz).

FIG. 10b is a graph illustrating the performance of the conventional reradiation antenna 200. A reflection coefficient near the mobile communication frequencies (900 MHz, 1800 MHz, 2100 MHz and 2700 MHz) is also smaller than the reflection coefficient shown in FIG. 6b. In other words, the reradiation antenna 200 of the present disclosure may minimize the influence on the wireless charging device 100 and have the more efficient performance than the conventional reradiation antenna 20.

Referring to FIG. 5b, the reradiation antenna 200 shown in FIG. 5a has a performance with a valid size or more in a high frequency band (near 1800 MHz, 2100 MHz and 2700 MHz) and a performance with a lower size in a low frequency band (near 900 MHz).

Figure 6A:
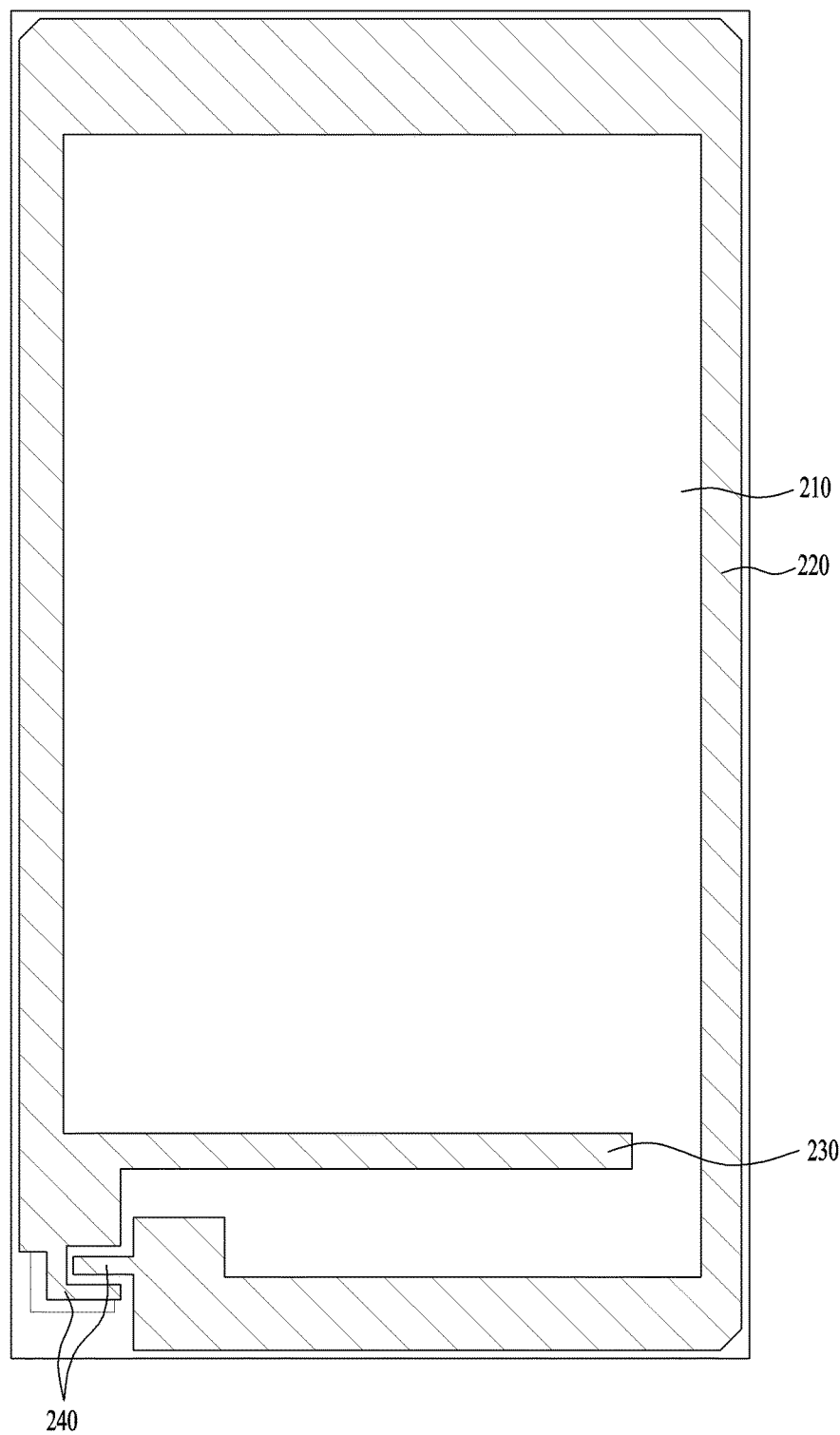
FIG. 6a is a plane view illustrating one surface of the reradiation antenna in accordance with another embodiment.

To compensate that, a monopole type auxiliary radiation unit 230 for transceiving low frequency band signals may be further provided as shown in FIG. 6a. FIG. 6a is a plane view illustrating one surface of the reradiation antenna 200 in accordance with another embodiment. It is shown that the auxiliary radiation unit 230 is extended from the loop-shaped radiation unit 220. The auxiliary radiation unit 230 is arranged near the power supply source and extended from the portion near one end of the loop-shaped radiation unit 220 to enhance the performance.

As shown in FIG. 3, the antenna loaded in the mobile terminal 600 is commonly located in the upper and lower portions of the mobile terminal 600. Especially, the main antenna used in mobile communication is located in the lower end of the mobile terminal 600. Accordingly, it is preferred that the main antenna is arranged in the portion where the lower end of the mobile terminal 600 is located.

To locate the auxiliary radiation unit 230 in the lower portion of the loop-shaped radiation unit 220, one end of the loop-shaped radiation unit 220 is located in a lower portion of the insulating board 210 and both ends of the loop-shaped radiation unit 220 may be located in a lower corner of the insulating board 210 to secure the length of the auxiliary radiation unit 230.

Figure 6B:
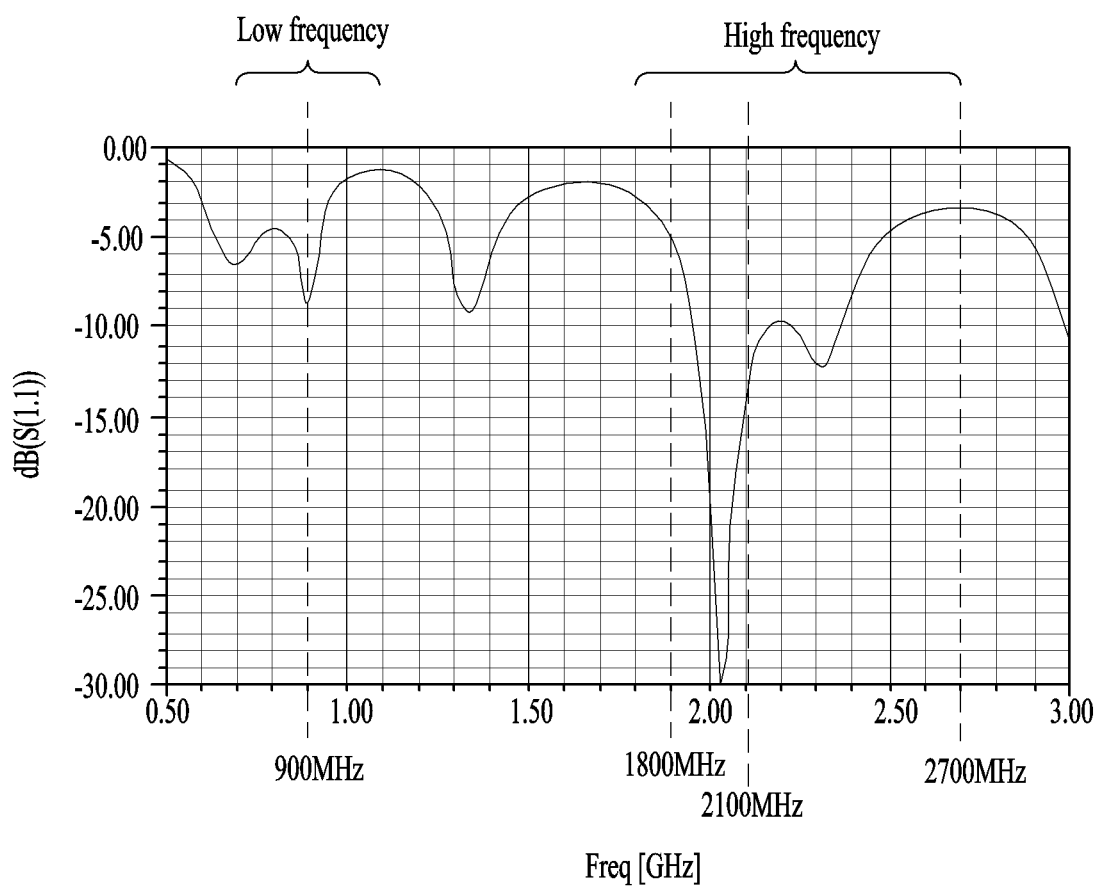

FIG. 6b is an S-parameter graph showing efficiency of the reradiation antenna 200 shown in FIG. 6a. It is shown that a reflection coefficient is smaller in the low frequency band, compared with the reflection coefficient shown in FIG. 5b and it is checked that the performance of the antenna is improved.

Figure 7A:
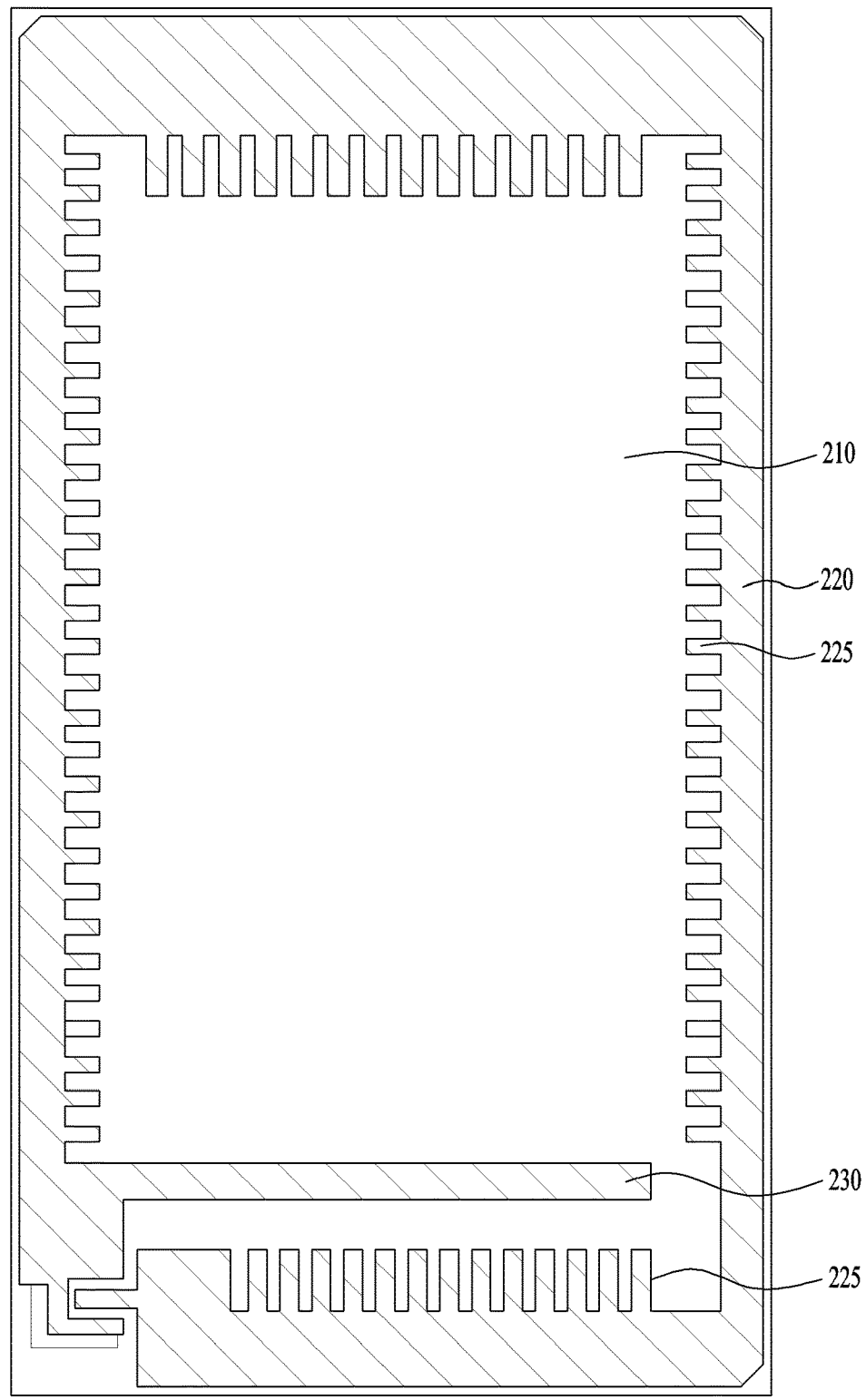
FIG. 7a is a plane view illustrating one surface of the reradiation antenna in accordance with a further embodiment.
Figure 7B:
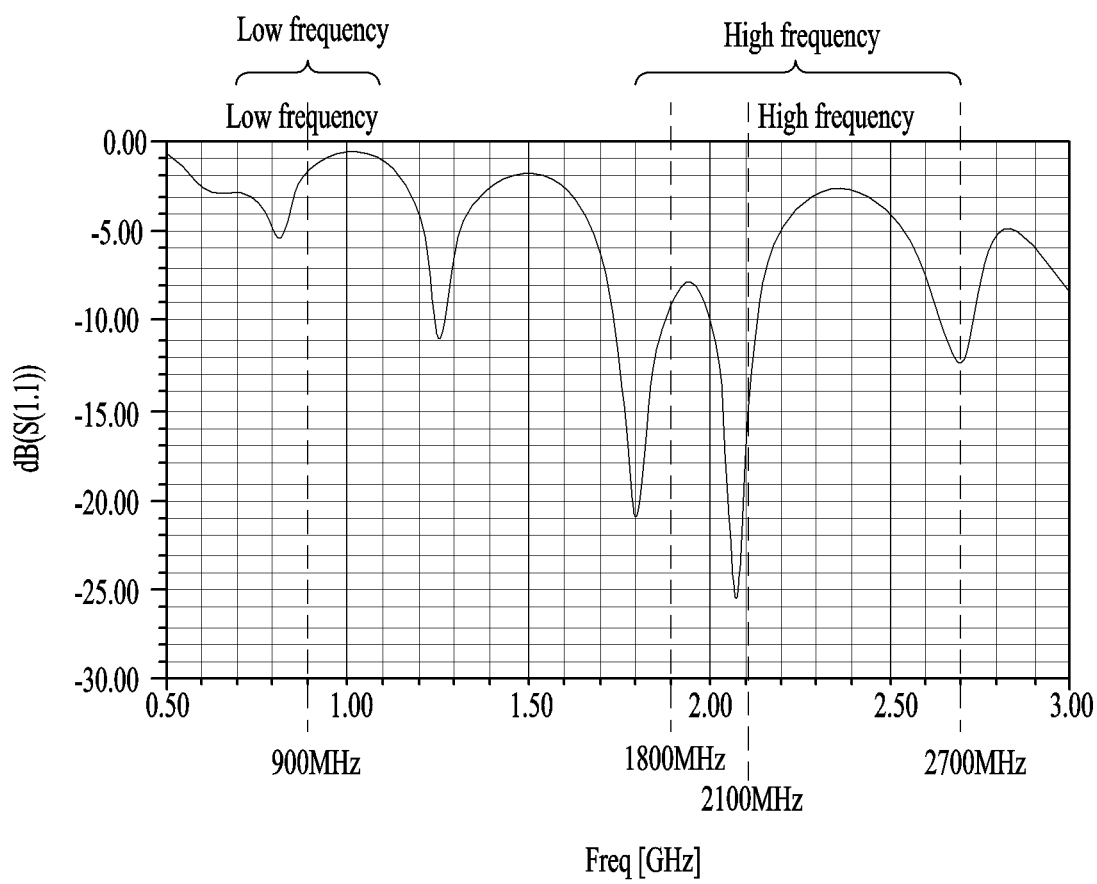

FIG. 7a is a plane view illustrating one surface of the reradiation antenna 200 in accordance with a further embodiment. FIG. 7b is an S-parameter graph showing efficiency of the reradiation antenna 200 shown in FIG. 7a.

Projections 225 may be formed in the loop radiation unit 220 to enhance the efficiency of the signal in the mobile communication frequency band (900 MHz, 1800 MHz, 2100 MHz and 2700 MHz). Referring to FIG. 7b, the strength of the signal becomes relatively larger in the mobile communication frequency band (900 MHz, 1800 MHz, 2100 MHz and 2700 MHz). When adjusting the size, length and distance of the projections 225, the efficiency of the reradiation antenna 200 may vary as shown in FIG. 7b. Especially, the length and the distance may be adjusted to enhance the performance of the signal in the mobile communication frequency band.

Figure 8:
Figure 8:
Figure 8:
Figure 8:
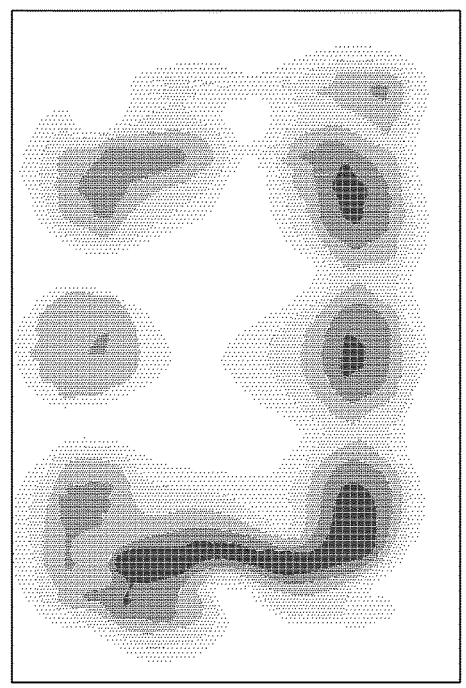

FIG. 8 is a drawing which shows distribution of electric fields for frequency bands of the reradiation antenna 200 shown in FIG. 7a. The electric field is the strongest in a low frequency dark-colored area and the strong electric field is distributed in the dark colored area to have a higher efficiency. Especially, the strength of the electric field is high in all of the frequency bands in the portion where the lower end of the mobile terminal 600 is located, so as to have the highest efficiency when the mobile terminal 600 is disposed in a proper location.

Figure 9:
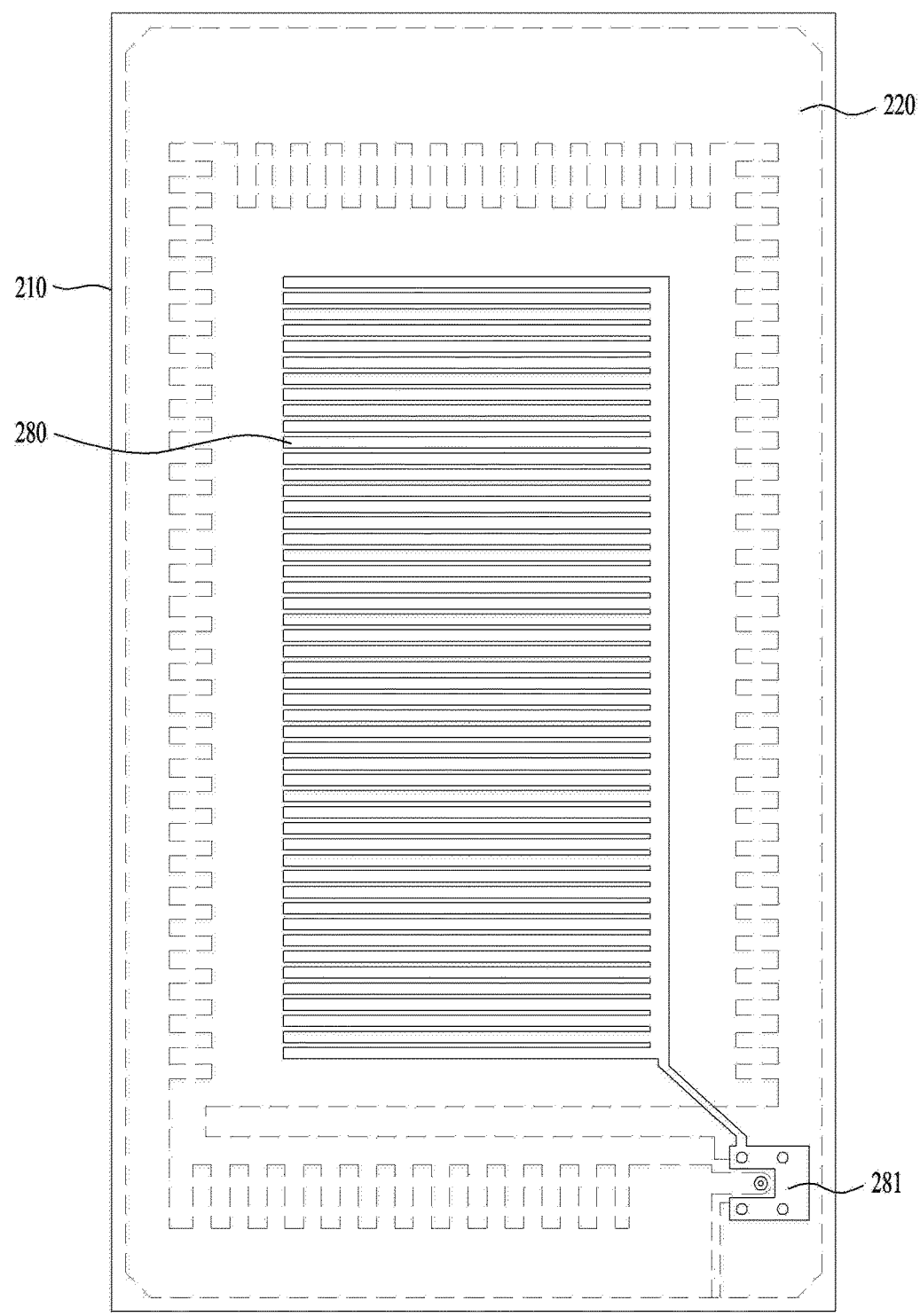
FIG. 9 is a low view illustrating the other opposite surface of the reradiation antenna in accordance with the present disclosure.

FIG. 9 is a low view illustrating the other opposite surface of the reradiation antenna 200 in accordance with the present disclosure. An electromagnetic field shut-off pattern 280 may be formed in one surface and the other opposite surface where the reradiation antenna 200 is formed. The device using the electromagnetic field is under restraints of EMI (Electro Magnetic Interference) to restrict emission of electromagnetic waves with a preset size or more.

The electromagnetic field shut-off pattern 280 may be a thin film made of a conductive material capable of reducing the electromagnetic field emitted outside so as to prevent the device using the electromagnetic field from affecting external devices. The electromagnetic field shut-off pattern may have a preset pattern for shutting off the performance deterioration of the product and enhancing the shut-off efficiency.

The electromagnetic field shut-off pattern 280 includes the conductive material and formed in a tape-shaped pattern extended in a perpendicular direction (a horizontal direction) with respect to the extended direction of the radiation units 220 and 230 shown in FIG. 9 so as to minimize the influence on the reradiation antenna 200. One end of the electromagnetic field shut-off pattern 280 may be connected with the ground by the connector 260.

According to at least one of the embodiments, the reradiation antenna 200 may receive and transmit the wireless signal to the mobile terminal, while not deteriorating the performance of the wireless charging device 100.

Furthermore, the performance of the reradiation antenna 200 may not be deteriorated by the electromagnetic field shut-off sheet of the wireless charging device 100. Accordingly, the reradiation antenna 200 has a high efficiency.

Still further, the reradiation antenna 200 may be applicable in transceiving signals with diverse frequencies and have versatility.

As mentioned above, the heat generated in the drive chip of the mobile terminal may be effectively emitted. Only the portion of the mobile terminal, where the drive chip is loaded, may be prevented from being heated when the user is using the mobile terminal and the other components may be prevented from being damaged by the heat. In addition, the shock applied to the frame may not be transferred to the drive chip but be absorbed by the flexible material having a high compressibility. When a particular feature, structure, or characteristic is described in connection with any embodiment, it is submitted that it is within the purview of one skilled in the art to affect such feature, structure, or characteristic in connection with other ones of the embodiments.

What is claimed is:

1. A reradiation antenna coupling with an antenna of a mobile terminal, the reradiation antenna comprising:
    an insulating board;
    a loop-shaped radiation unit formed along a circumference of the insulating board in one surface of the insulating board, with one end and the other end which are arranged adjacent to each other;
    a ground connected with the end of the radiation unit; and
    a power supply unit connected with the other end of the radiation unit and configured to supply an electric power,
    wherein upper and lower portions of the loop-shaped radiation unit are thicker than other portions of the loop-shaped radiation unit.

2. The reradiation antenna of claim 1, wherein the insulating board is rectangular-shaped, and
    the end and the other end of the radiation unit are arranged adjacent to one corner of a lower end of the insulating board.

3. The reradiation antenna of claim 2, further comprising:
    an auxiliary radiation unit extended from a portion near the end of the radiation unit in a horizontal direction with respect to the insulating board.

4. The reradiation antenna of claim 3, wherein the auxiliary radiation unit is located in the loop of the radiation unit.

5. The reradiation antenna of claim 3, wherein a portion of the radiation unit arranged in a horizontal direction of the insulating board has a larger width than a portion of the insulating board in a vertical direction.

6. The reradiation antenna of claim 1, wherein the radiation unit comprises a plurality of projections projected toward an inner portion of the loop.

7. The reradiation antenna of claim 6, wherein the plurality of the projections are arranged at equidistant intervals.

8. The reradiation antenna of claim 1, further comprising:
    an electromagnetic field shut-off pattern located in a central portion of the other surface of the insulating board and comprising a plurality of conductive tapes which are extended horizontally and arranged vertically, in parallel.

9. The reradiation antenna of claim 1, wherein the radiation unit comprises at least one of Polysilicon, Ceramic, Carbon fiber, Conductive ink, Conductive paste, ITO (Indium Tin Oxide), CNT (Carbon Nano Tube) and conductive polymer.

10. A wireless charging device comprising:
    a housing;
    a power transmission coil located in the housing and configured to transmit power to an external mobile terminal;
    a reradiation antenna located on the wireless transmission coil and configured to receive and re-radiate an antenna signal for the external mobile terminal; and
    a power supply unit configured to supply power to the power transmission coil and the reradiation antenna,
    wherein the reradiation antenna comprises:
    an insulating board;
    a loop-shaped radiation unit formed along a circumference of the insulating board in a predetermined portion of one surface of the insulating board, where the loop-shaped radiation unit is not overlapped with the power transmission coil;
    a ground connected with the end of the radiation unit; and
    a power supply unit connected with the other end of the radiation.

11. The wireless charging device of claim 10, wherein the insulating board is rectangular-shaped, and
    the end and the other end of the radiation unit are arranged adjacent to one corner of a lower end of the insulating board.

12. The wireless charging device of claim 10, further comprising:
    an auxiliary radiation unit extended from a portion near the end of the radiation unit in a horizontal direction with respect to the insulating board.

13. The wireless charging device of claim 10, wherein the radiation unit comprises a plurality of projections projected toward an inner portion of the loop.

14. The wireless charging device of claim 10, further comprising:
    an electromagnetic field shut-off pattern located in a central portion of the other surface of the insulating board and comprising a plurality of conductive tapes which are extended horizontally and arranged vertically, in parallel.

15. The reradiation antenna of claim 2, wherein the radiation unit comprises a plurality of projections projected toward an inner portion of the loop.

16. The reradiation antenna of claim 3, wherein the radiation unit comprises a plurality of projections projected toward an inner portion of the loop.

17. The wireless charging device of claim 11, wherein the radiation unit comprises a plurality of projections projected toward an inner portion of the loop.

18. The wireless charging device of claim 12, wherein the radiation unit comprises a plurality of projections projected toward an inner portion of the loop.

19. A reradiation antenna comprising:
an insulating board;
a loop-shaped radiation unit formed in one surface of the insulating board, with one end and the other end which are arranged adjacent to each other;
a ground connected with the end of the radiation unit; and
an electromagnetic field shut-off pattern located in a central portion of another surface of the insulating board.

20. The reradiation antenna of claim 19, wherein the electromagnetic field shut-off pattern comprises a plurality of conductive tapes which are extended horizontally and arranged vertically, in parallel.

\* \* \* \* \*